US010254987B2

(12) United States Patent
Shrader et al.

(10) Patent No.: US 10,254,987 B2
(45) Date of Patent: Apr. 9, 2019

(54) DISAGGREGATED MEMORY APPLIANCE HAVING A MANAGEMENT PROCESSOR THAT ACCEPTS REQUEST FROM A PLURALITY OF HOSTS FOR MANAGEMENT, CONFIGURATION AND PROVISIONING OF MEMORY

(71) Applicant: Samsung Electronics Co., Ltd., Gyeonggi-do (KR)

(72) Inventors: Steven L. Shrader, San Jose, CA (US); Harry R. Rogers, San Jose, CA (US); Robert Brennan, San Jose, CA (US); Ian P. Shaeffer, Los Gatos, CA (US)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/867,961

(22) Filed: Sep. 28, 2015

(65) Prior Publication Data

US 2016/0117129 A1 Apr. 28, 2016

Related U.S. Application Data

(63) Continuation-in-part of application No. PCT/US2014/069318, filed on Dec. 9, 2014.

(60) Provisional application No. 61/915,101, filed on Dec. 12, 2013, provisional application No. 62/098,645, filed on Dec. 31, 2014.

(51) Int. Cl.
*G06F 12/00* (2006.01)
*G06F 3/06* (2006.01)
*G06F 15/173* (2006.01)

(52) U.S. Cl.
CPC .......... *G06F 3/0638* (2013.01); *G06F 3/0604* (2013.01); *G06F 3/0611* (2013.01); *G06F 3/0631* (2013.01); *G06F 3/0673* (2013.01); *G06F 15/17306* (2013.01); *G06F 15/17312* (2013.01)

(58) Field of Classification Search
CPC .... G06F 3/0638; G06F 3/0604; G06F 3/0673; G06F 3/0631; G06F 3/0611
USPC ......... 711/105, 117, 165, 170; 710/317, 316
See application file for complete search history.

(56) References Cited

U.S. PATENT DOCUMENTS

| 6,510,161 | B2* | 1/2003 | Trevitt | ................. H04L 49/103 370/395.7 |
| 6,560,680 | B2* | 5/2003 | Meyer | ................. G06F 12/0888 711/138 |
| 7,330,992 | B2 | 2/2008 | Jeddeloh | |

(Continued)

OTHER PUBLICATIONS

International Search Report and Written Opinion dated Mar. 4, 2015, issued for PCT/US2014/069318.

*Primary Examiner* — Tuan V Thai
*Assistant Examiner* — Tasnima Matin
(74) *Attorney, Agent, or Firm* — Van Pelt, Yi & James LLP

(57) ABSTRACT

Example embodiments provide a disaggregated memory appliance, comprising: a plurality of leaf memory switches that manage one or more memory channels of one or more of leaf memory modules; a low-latency memory switch that arbitrarily connects one or more external processors to the plurality of leaf memory modules over a host link; and a management processor that responds to requests from one or more external processors for management, maintenance, configuration and provisioning of the leaf memory modules within the memory appliance.

13 Claims, 5 Drawing Sheets

(56) References Cited

U.S. PATENT DOCUMENTS

| | | | |
|---|---|---|---|
| 8,327,187 B1* | 12/2012 | Metcalf | G06F 13/4221 |
| | | | 714/10 |
| 2002/0194290 A1* | 12/2002 | Steely, Jr. | H04L 63/029 |
| | | | 709/208 |
| 2004/0006584 A1* | 1/2004 | Vandeweerd | G06F 9/5066 |
| | | | 718/107 |
| 2005/0050255 A1* | 3/2005 | Jeddeloh | G11C 5/00 |
| | | | 710/317 |
| 2006/0039370 A1* | 2/2006 | Rosen | H04L 49/3018 |
| | | | 370/389 |
| 2010/0070748 A1* | 3/2010 | Duan | H04L 12/40006 |
| | | | 713/2 |
| 2010/0202449 A1 | 8/2010 | Moscibroda et al. | |
| 2010/0296437 A1* | 11/2010 | Stelle | H04L 45/125 |
| | | | 370/328 |
| 2011/0225333 A1 | 9/2011 | Wang | |
| 2011/0289268 A1 | 11/2011 | Patel | |
| 2013/0275707 A1* | 10/2013 | Schenfeld | G06F 12/0292 |
| | | | 711/165 |
| 2014/0143520 A1* | 5/2014 | Dobbs | G06F 15/76 |
| | | | 712/30 |
| 2014/0201461 A1* | 7/2014 | Dalal | H04L 47/193 |
| | | | 711/141 |

\* cited by examiner

DISAGGREGATED MEMORY APPLIANCE HAVING A MANAGEMENT PROCESSOR THAT ACCEPTS REQUEST FROM A PLURALITY OF HOSTS FOR MANAGEMENT, CONFIGURATION AND PROVISIONING OF MEMORY

CROSS-REFERENCE TO RELATED APPLICATIONS

This application is a continuation-in-part of PCT Application PCT/US2014/069318, filed Dec. 9, 2014, which claims priority to U.S. Provisional Patent Application Ser. No. 61/915,101, filed Dec. 12, 2013, entitled "Disaggregated Memory Appliance," and to U.S. Provisional Patent Application Ser. No. 62/098,645, filed Dec. 31, 2014, entitled "A disaggregated memory appliance with management processor," which are herein incorporated by reference.

BACKGROUND

With large datacenter configurations, it is difficult to effectively provision CPU, memory, and persistent memory resources such that those resources are used efficiently by the systems. Memory, for example, is often over provisioned, which results in large amounts of memory being "stranded" in various servers and not being used. Solutions are needed to allow large pools of resources (e.g. dynamic memory) to be shared and allocated dynamically to various processors or instances such that the resources are used efficiently and no resources are stranded.

Additionally, many computer applications (e.g. datacenter applications) require large amounts of DRAM memory. Unfortunately, it is becoming increasingly difficult to add more memory to server systems. Increasing bus speeds, among other factors, actually cause the number of modules in the system to go down over time due to signaling challenges. Meanwhile, the applications using servers are requiring an increasing amount of DRAM memory that is outpacing the system's ability to provide it. In memory databases, for example, can require terabytes (TB) of DRAM to run efficiently.

Two primary issues that need to be solved are: 1) how to add very large numbers of DRAMs to a memory bus without loading down the bus; and 2) how to physically fit the DRAMs into the available volumetric space inside the server or, alternatively, enable methods to have low-latency memory reside outside of the server enclosure.

New methods are needed to enable server systems to increase the amount of DRAM in the system while maintaining low latency and high interconnect bandwidth. The methods and systems described herein may address one or more of these needs.

BRIEF SUMMARY

The example embodiments provide a disaggregated memory appliance, comprising: a plurality of leaf memory switches that each manage one or more memory channels of one or more of leaf memory modules; a low-latency memory switch that arbitrarily connects one or more external processors to the plurality of leaf memory modules over a host link; and a management processor that responds to requests from one or more external processors for management, maintenance, configuration and provisioning of the leaf memory modules within the memory appliance.

BRIEF DESCRIPTION OF SEVERAL VIEWS OF THE DRAWINGS

These and/or other features and utilities of the present general inventive concept will become apparent and more readily appreciated from the following description of the embodiments, taken in conjunction with the accompanying drawings of which.

DETAILED DESCRIPTION

Figure 1:
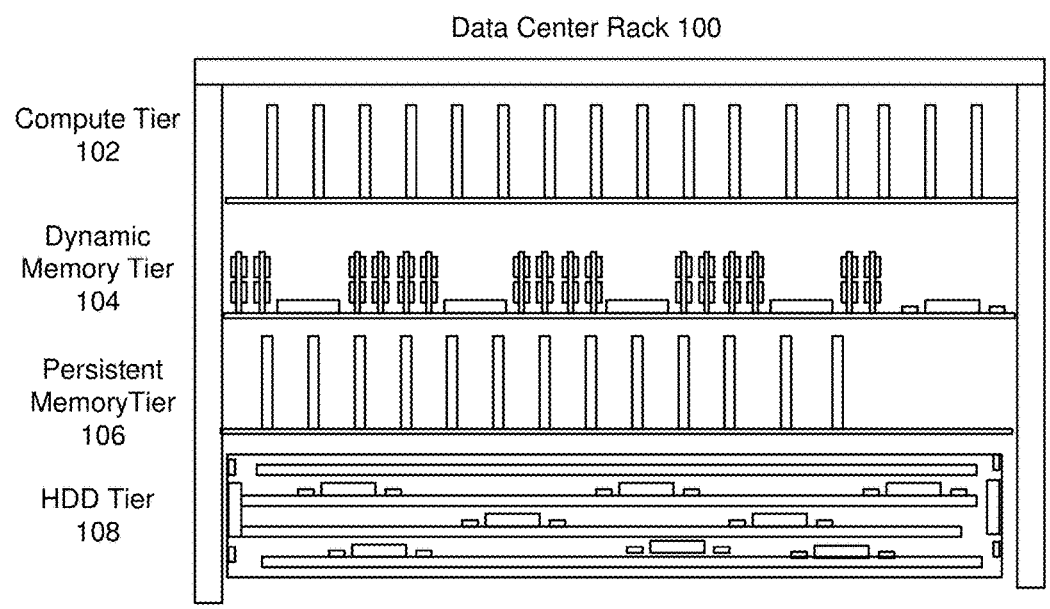
FIG. 1 is a diagram illustrating an example datacenter rack configuration.

Reference will now be made in detail to some example embodiments of the present general inventive concept, which are illustrated in the accompanying drawings, wherein like reference numerals refer to the like elements throughout. The embodiments are described below in order to explain the present general inventive concept while referring to the figures.

Advantages and features of the present invention and methods of accomplishing the same may be understood more readily by reference to the following detailed description of embodiments and the accompanying drawings. The present general inventive concept may, however, be embodied in many different forms and should not be construed as being limited to the embodiments set forth herein. Rather, these embodiments are provided so that this disclosure will be thorough and complete and will fully convey the concept of the general inventive concept to those skilled in the art, and the present general inventive concept will only be defined by the appended claims. In the drawings, the thickness of layers and regions are exaggerated for clarity.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

The term "component" or "module", as used herein, means, but is not limited to, a software or hardware component, such as a field programmable gate array (FPGA) or an application specific integrated circuit (ASIC), which performs certain tasks. A component or module may advantageously be configured to reside in the addressable storage medium and configured to execute on one or more processors. Thus, a component or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for the components and components or modules may be combined into fewer components and components or modules or further separated into additional components and components or modules.

Unless defined otherwise, all technical and scientific terms used herein have the same meaning as commonly understood by one of ordinary skill in the art to which this invention belongs. It is noted that the use of any and all examples, or example terms provided herein is intended merely to better illuminate the invention and is not a limitation on the scope of the invention unless otherwise specified. Further, unless defined otherwise, all terms defined in generally used dictionaries may not be overly interpreted.

The example embodiments provide a disaggregated memory appliance that enables server systems to increase the amount of DRAM in the system while maintaining low latency and high interconnect bandwidth. The disaggregated memory appliance may be used in data centers and/or other environments.

The methods and systems of the example embodiments may include one or more of: i) Aggregation of "leaf" memory systems that manage DIMMs in numbers small enough to accommodate the physics of capacity-limiting standards such as DDR4. ii) Use of a very-low-latency, switched link to arbitrarily connect a plurality of leaf memory systems to a plurality of hosts. In some cases, the link may be memory architecture agnostic. iii) Encapsulation of memory-architecture-specific semantics in a link protocol; iv) Use of a management processor to accept requests from hosts for management, maintenance, configuration and provisioning of memory. And v) use of wormhole routing, in which the endpoints use target routing data, supplied during the memory provisioning process, to effect low-latency routing of memory system data and metadata. The method and system may also include the devices, buffers, switch(es) and methodologies for using the above.

For example, in various embodiments, the method and system may include on or more of the following: i) One or more layers of switching; ii) Low latency routing protocol; iii) Light compute complexes for boot, MMU, atomic transactions, and light compute offload; iv) Optional fabric to link multiple memory appliances; v) RAS features; vi) Dynamic memory allocation; and vii) Protocols for dynamic allocation of memory.

Disaggregation is one method to help dynamically allocate resources from a shared pool to various applications and OS instances. As used herein, disaggregation refers to the partitioning of a computer system into functional elements. Said elements can be physically separated, and the functions and resources of said elements can be allocated and connected in part or in whole to create complete systems on an ad hoc basis. A disaggregated memory appliance is a physical embodiment of memory functions and resources that can be applied to a disaggregated computing system.

This concept is illustrated in FIG. 1, which is a diagram illustrating an example datacenter rack configuration. The resources of a data center rack 100 typically found in a single server system are split into tiers and physically separated into separate enclosures (or even into separate racks or rows within a datacenter). The three primary tiers are a compute tier 102, a dynamic memory tier 104 (e.g. DRAM), and a persistent memory tier 106 (e.g. flash). A fourth tier may comprise a hard disk drive tier 108.

The compute tier 102 comprises a plurality of processors or CPUs (also referred to as hosts). The dynamic and persistent memory tiers 104 and 106 have large pools of respective memory resource that can be partially or wholly allocated to each of the processors (or VM, OS instance, thread etc.) in the compute tier. These memory resources can be allocated at boot time and can remain relatively static, or they can be continuously adjusted to meet the needs of applications being executed by the processors. In some cases (such as XaaS business models) the memory resources may be reallocated with each job run on the particular CPU/VM/OS instance.

Figure 2:
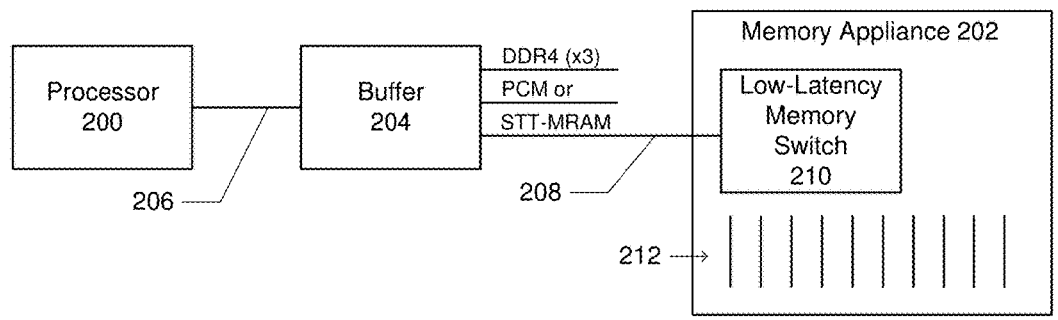
FIG. 2 is a diagram that illustrates, conceptually, how a compute tier connects to a shared memory appliance such as the dynamic memory tier.

FIG. 2 is a diagram that illustrates, conceptually, how a compute tier connects to a shared memory appliance such as the dynamic memory tier. One of the processors (e.g. a CPU or SOC) 200 from the compute tier 102 is shown coupled to one of the memory appliances 202 from the dynamic memory tier 104 through a buffer 204. The buffer 204 may be attached to the processor 200 through a link 206. In one embodiment, the link 206 may comprise an existing high speed link such as DDRx, PCIe, SAS, SATA, QPI, and the like, or it may be a new dedicated link. The buffer 204 may have memory directly attached to it (e.g. DDR4) such that the buffer 204 acts as a full memory controller for both local ("near") memory as well as the memory appliance ("far" memory). Note that the buffer 204 itself may not be necessary and may be included as one or more functional blocks on the processor 200 or in the memory appliance.

In addition to (optionally) having local, direct attached memory, the buffer may be connected to the memory appliance 202 through a low-latency, high speed "host" link 208. Since the memory appliance 202 is generally a separate enclosure, many embodiments of this host link 208 would be cable-based to exit one enclosure and route to another. However, this host link 208 may be crossbar-based (such as in the case of a large server system or a blade-based architecture). The memory appliance 202 itself contains a large amount of memory 212, with one or more layers of switching, such as the low-latency memory switch 210, to route memory requests and data from the processor 200 to the appropriate memory resources.

Figure 3:
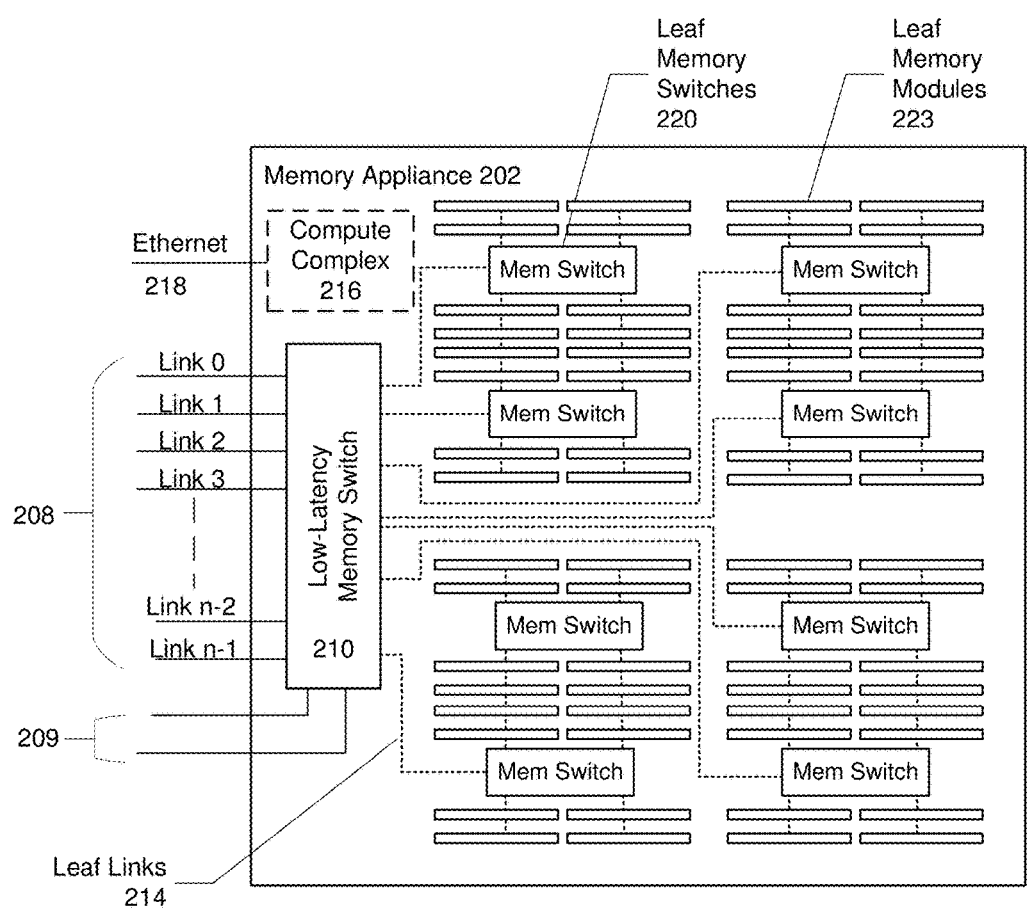
FIG. 3 is a diagram showing an embodiment of the memory appliance in further detail.

FIG. 3 is a diagram showing an embodiment of the memory appliance in further detail. The memory appliance includes large amounts of memory 212, which in many embodiments is configured as an aggregation of standard memory modules (such as DDR4 DIMMs and the like), referred to herein as leaf memory modules 223 housed in an enclosure of the memory appliance 202 in numbers small enough to accommodate the physics of capacity-limiting standards such as DDR4.

According to one aspect of the example embodiments, the memory appliance 202 comprises a plurality of switching layers. The first switching layer may comprise the low-latency memory switch 210 coupled to the host link 208 over which the low-latency memory switch 210 receives traffic/requests from one or more external processors. A second switching layer may comprise a plurality of leaf links 214 that connect the low-latency memory switch 210 to a plurality of leaf memory switches 220. The third switching layer may comprise a plurality of leaf memory switches 220 that are each connected to, and manage, one or more memory channels of one or more of leaf memory modules 223 (e.g., in the case of DDR4, typically 1-3 modules). Due to the presence of the switching layers, the low-latency memory switch 210 is able to arbitrarily connect one or more of the external processors to the leaf memory modules 223.

In one embodiment, the low-latency memory switch 210 may manage traffic/requests from many incoming host links 208 from many different CPUs or many different servers.

The low-latency memory switch 210 inspects an address associated with the incoming traffic/requests, and routes the traffic/request to the appropriate leaf link in the form of a traffic/request packet. The leaf link 214 receives the traffic/request packet from the low-latency memory switch 210 and routes the packet to the memory switch 220 corresponding to the appropriate memory channel. In one embodiment, the low-latency memory switch 210 may further include a mesh interface 209 to other memory appliances.

The architecture of the leaf links 214 themselves enables very low latency switching. In one embodiment, for example, the low-latency switching includes wormhole switching. As is well-known, wormhole switching or wormhole routing is a system of simple flow control in computer networking based on known fixed links. It is a subset of flow control methods called Flit-Buffer Flow Control. Wormhole switching breaks large network packets into small pieces called flits (flow control digits). The first flit, called the header flit, holds information about this packet's route (namely the destination address) and sets up the routing behavior for all subsequent flits associated with the packet. The head flit is followed by zero or more body flits, containing the actual payload of data. The final flit, called the tail flit, performs some book keeping to close the connection between the two nodes. The wormhole technique does not dictate the route a packet takes to a destination but decides the route when the packet moves forward from a router, and allocates buffers and channel bandwidth on the flit level, rather than the packet level.

Thus, one example embodiment makes use of wormhole switching in which endpoints use target routing data of the memory data flits, supplied during the memory provisioning process, to affect low-latency switching of memory data flits and metadata. In further detail, endpoints of fixed links between host processors and the memory modules 223 encode terse addressing into the header of a flit that enables the low-latency memory switch 210 and leaf 220 to receive the header flit, decode the address, re-encode an address and route the payload of flits before the data flits arrive at the switch. The routing logic is then free to decode another flit from another source as soon as the path for the original flit through the switch is established. In FIG. 2, the buffer 204 represents a host endpoint, while in FIG. 3, the memory switches 220 represent memory module endpoints.

The switching network of the example embodiment employs wormhole switching in which: i) Packets are transmitted in flits. 2) The header flit contains all routing info for a packet. 3) Flits for a given packet are pipelined through the switching network. 4) A blocked header flit stalls all trailing data flits in intermediary switching nodes. And 5) only one flit need be stored at any given switch.

The link architecture described herein may use wormhole switching to enable very low-latency movement of memory data flits between processors and memory subsystems. The switches 210, 220 receive a flit and decide, based on physical addressing, when the flit moves forward and which interconnect is used to move the flit.

The memory appliance 202 may also include extra or specialized links 209 (FIG. 3) to create a fabric between multiple memory appliances. This can be important for high-availability features such as fail-over or mirroring and may also be used to scale out memory capacity to larger sizes.

In one embodiment, the memory appliance 202 may further include an optional compute complex 216 (e.g., a processor and supporting logic and/or an MMU) to enable multiple functions. These functions can include boot and initial configuration of the memory appliance, coordination of memory allocation with multiple server or CPU "hosts," and compute "off-loading." In one embodiment, the compute "off-loading" function may enable a reduction in memory traffic between the host and appliance by the use of simple atomic operations (e.g. read-modify-write), application specific optimizations for Hadoop (e.g. map reduce), and the like, and RAS features. In one embodiment, the RAS features may include memory sparing, memory RAID and failover, error and exception handling, thermal exception handling, throttling, and hot swap, and local power management.

In a further embodiment, the compute complex 216 may also be used to aid in setup of the wormhole routing. The compute complex 216 may enable multiple functions in this respect, including:
  i) Measurement of the topology of the interconnection among hosts and DRAM arrays
  ii) Reporting to link endpoints addressing information required to create flit headers
  iii) RAS features such as:
    (1) Error and exception handling
    (2) Throttling.

In one embodiment, the compute complex 216 may communicate with external processors, including host servers for configuring and managing the memory allocation. In one embodiment, the communication may be enabled by a port 218, such as an Ethernet or other network port, on the compute complex 216. In another embodiment, configuration and memory allocation may be managed through the host links 208 to the memory appliance 202.

According to a further aspect of some embodiments, the memory appliance 202 may further include a management processor (MP) that responds to requests from the external processors for management, maintenance, configuration and provisioning of the leaf memory modules 223 within the memory appliance 202. In one embodiment, the management processor may be implemented within the compute complex 216, while in a second embodiment the management processor may be implemented within the leaf memory switches 220 or the low-latency memory switch 210.

Figure 4:
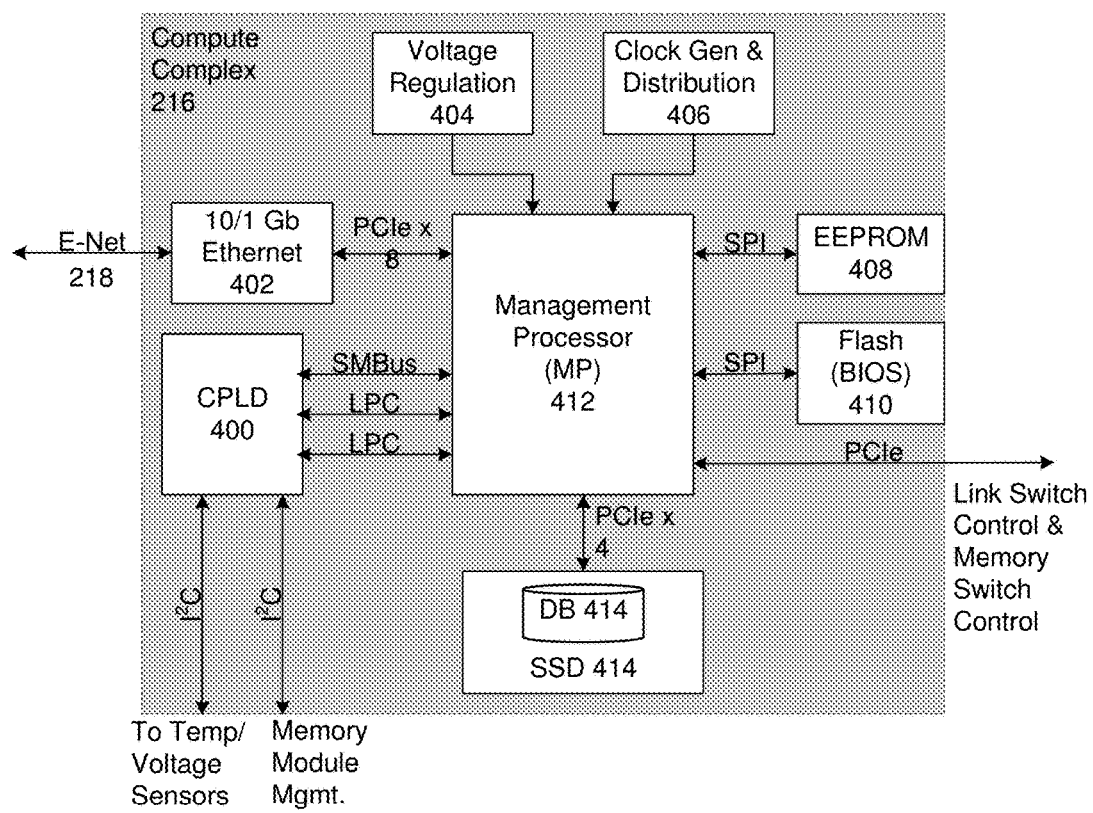
FIG. 4 is a diagram illustrating components of compute complex in an embodiment where the management processor is implemented as part of the compute complex.

FIG. 4 is a diagram illustrating components of the compute complex 216 in an embodiment where the management processor is implemented as part of the compute complex 216. The management processor 412 may comprise a system on a chip (SOC) that may be coupled to other components of the compute complex 216, including a complex programmable logic device (CPLD) 400, an Ethernet port 402, a voltage regulation component 404, a clock generator and distribution component 406, an EEPROM 408, a flash (BIOS) memory 410, and a solid-state drive (SSD) 414, which in one embodiment may be implemented using a Next Generation Form Factor (NGFF). In another embodiment, the management processor 412 may comprise any CPU complex appropriate for embodiments disclosed herein, even an off-the-shelf server to which appropriate interfaces to the memory appliance has been added.

The MP 412 accepts and process requests from external host processors (via, e.g., port 218) for access to or provisioning of the leaf memory modules 223, based on policy from a datacenter resource management service and authentication from a datacenter authentication service. The MP 412 configures the leaf memory modules 223 and leaf memory switches 220 to satisfy requests for memory. The MP 412 responds to requests by granting access and providing physical/logical access methods and memory attributes or denying access based on policy, authentication or resource constraints. The MP 412 may provision resources for itself as required.

In one embodiment the MP 412 may create and maintain a configuration and allocation database 414 to manage physical leaf memory modules 223 in the memory appliance 202.

Subsequent access to the memory appliance 202 by the external host processors may be governed by policy implemented by way of configuration of link, switch and memory control hardware. The MP 412 does not participate in data movement beyond this configuration except to access resources provisioned for itself.

Figure 5:
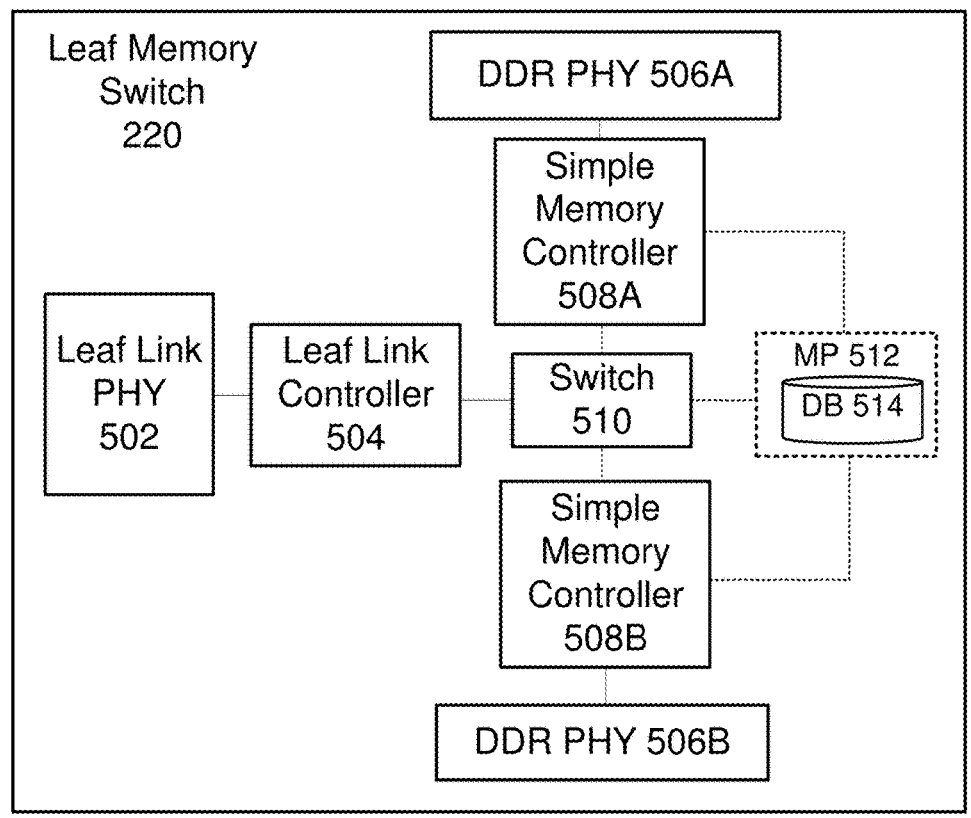
FIG. 5 is a diagram illustrating at least one of the leaf memory switches in further detail.

Advantages provided by use of the MP 412 may include:
i) Enabling provisioning and configuration of bulk memory to multiple host processors.
ii) Provisionable memory prevents stranded resources, allowing customers to dynamically provision optimum compute, memory, and persistence combinations
iii) Allows independent CPU, memory, and persistence replacement cycles that make sense for each individual technology roadmap
iv) Enables significantly larger memory capacities per server/processor/core
v) Highly scalable solution—enables adding more memory subsystems boxes for more capacity or greater bandwidth FIG. 5 is a diagram illustrating at least one of the example embodiment leaf memory switches 220 in further detail. FIG. 5 also shows the optional embodiment in which the management processor 512 is incorporated into leaf memory switches 220. The leaf memory switch 220 contains a leaf link PHY 502 coupled to an optional leaf link layer controller 504 to manage the leaf links 214 shown in FIG. 3. A very low latency switch 510 is coupled to the leaf link controller 504. Traffic from the low-latency memory switch 210 by the leaf links 214 is routed through the leaf link PHY 502 and the leaf link controller 504 to the low latency switch 510, which determines which of one or more DDR channels is the correct destination/source for the traffic. Each DDR channel includes simple/lightweight memory controllers 508A or 508B and PHYs 506A or 506B (e.g. DDRx) pair coupled to the low latency memory switch 510. The simple memory controllers 508A and 508B are generally simplified versus controllers normally found in processors due to the limited memory traffic cases being handled.

According to one example embodiment, the leaf memory switch 220 may alternatively include a management processor (MP) 512 that is coupled to and accesses control and data of the simple memory controllers 508A and 508B and responds to requests from the external processors for management, maintenance, configuration and provisioning of the leaf memory modules within the memory appliance. Communication with the MP 512 may be made in the low-latency memory switch 210 via a management port (not shown).

Similar to the embodiment where the MP is implemented in the compute complex 216, the MP 512 may create and maintain a configuration and allocation database 514 to manage the physical memory in the memory appliance 202. Operation of the MP 512 is similar as described for MP 412 of FIG. 4.

While DRAM technologies are broadly deployed and standardized, the device characteristics evolve over time and require adjustments to the device interfaces and to the controllers that manage those interfaces. For example, a synchronous interface like DDR may be modified to increase clock speed in order to enable higher bandwidth through the interface. This, in turn, requires adjustment of the number of clocks that may be required for a DRAM to move from one state to the next. Furthermore, other memory technologies may be considered to supplant or supplement DRAM and may be bound by the same or similar scaling constraints that DRAMs exhibit. Such memory technologies may be transactional instead of synchronous or may be block-oriented rather than byte-addressable. Furthermore, large-scale deployments may have lifetimes that span the evolution of these technologies or may require the use of more than one of these technologies in a given deployment. It is therefore likely that a given disaggregation of memory in a large-scale deployment would have to support a range of technologies and a range of performance within each of those technologies.

According to one embodiment, memory technologies may be disparate within the memory appliance 202 and/or across multiple memory appliances. A further aspect of the example embodiments provides a low-latency routing protocol used by both the low-latency memory switch 210 and the leaf memory switches 220 that encapsulates memory technology specific semantics by use of tags that uniquely identify specific types of memory technology used in the memory appliance 202. These memory-technology-specific tags may be used during provisioning, monitoring and operation of the memory appliance 202. In one embodiment, the management processor 412, 512 discovers the specific types of memory technology and stores in the configuration database 414, 514, the tags for each of the discovered types of memory technology. In one embodiment, the tags for each technology are then used to identify context for commands and transactions received in the requests from the external host processors during operation of the memory appliance.

The low-latency routing protocol supports a broad spectrum of memory technologies by encapsulating the nature and semantics in the database 414, 514 as technology semantics (block/byte, synchronous/transactional, etc.) and device parameters (CAS latency, erase block size, page write latency, etc.). Database 414, 514 is populated by the MP 412, 512 (respectively) and reported to host processors during a provisioning process. Each memory technology supported by a given memory appliance would be used to uniquely tag each technology set within the memory appliance with an appliance-unique tag that identifies the semantics and parameters of each technology.

The MP 412, 512 may discover device semantics and parameters by querying the simple memory controllers 508A and 508B for data describing the attached memory technologies and use such data to populate the database 414, 514.

A host processor requiring memory may negotiate with the MP 414, 512 to gain unique or shared access to memory and may specify the technology that it requires. The MP 412, 512 may respond granting memory provisions that meet the hosts' specifications, or alternatively, the provisions may be identified as a best-effort match to the host's requirements. Alternatively, the MP 412, 512 may expose its database 414, 514 to the host as a catalogue of available technologies, and the host may request a technology by the tag associated with the technology that it is requesting. In any case, the MP 414, 512 will supply a tag, as described above, to identify the technology provisioned to the host.

Upon the host's subsequent access to the provisioned memory, the technology tag would be used by the host to identify the context of a given packet sent to the simple memory controllers 508A and 508B. For example, a command to erase a block in memory may be sent by the host to one of the simple memory controllers 508A and 508B. This command may be unique to the flash technology available at the simple memory controllers 508A and 508B, but it may have a form that is similar to a command for another technology. Therefore the host may send the tag as a prefix to the command to give it context. While such context may be implicit by access to a specific simple memory controller 508A and 508B, use of the tag in the command packet enables monitoring, debug and a factor for packet validation by the simple memory controllers 508A and 508B.

Accordingly, through the use of the low-latency routing protocol, the memory appliance 202 is memory architecture agnostic.

Figure 6:
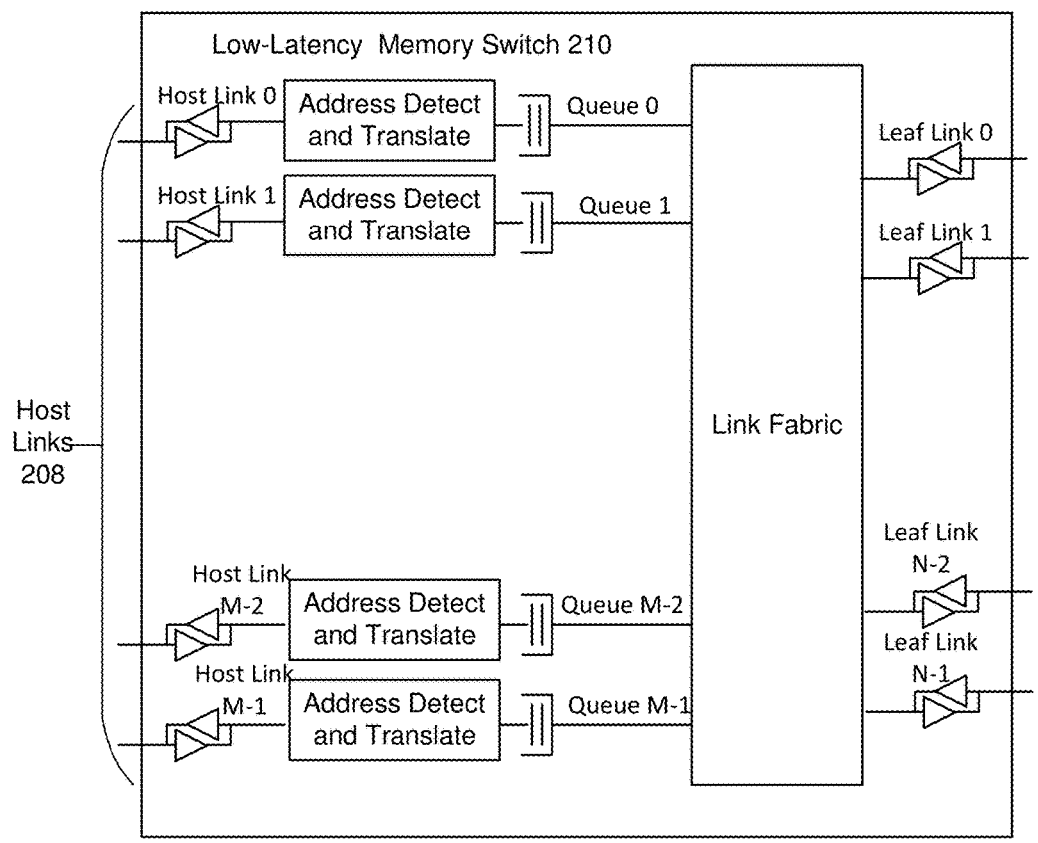
FIG. 6 is a diagram illustrating the low-latency memory switch in further detail.

FIG. 6 is a diagram illustrating the low-latency memory switch in further detail. As described above, the low-latency memory switch 210 may manage traffic/requests from many incoming host links 208 from many different processors/servers. The address detect and translate component may be used in the case where addressing apparent at the host buffer 204 must be abstracted (different) from the addressing required at the appliance. This could be done at the host buffer just as easily, or more likely, could be obviated by careful assignment of addressing parameters during the provisioning process.

The host links 208 to the memory appliance may hook into the CPU processors/servers via host links 208 through an existing DDR channel. For example, the following could be used: a module-based extender with a buffer/link translator and cable to appliance, a buffer on a motherboard with a dedicated DDR channel (or multiple channels) converted to the appliance link, a PCIe card or dedicated PCIe port to a buffer, a SAS pot dedicated to buffer, or a SATA. The link signaling solutions might be any of multiple types, including optical or electrical. And the link protocol might be a serialized memory protocol (e.g., serialized DDR4), packetized, or a wormhole routing protocol.

Memory switches may have varying levels of memory controller functionality, including none at all. In the embodiment where wormhole switching is used, queues 0 through M−1 shown in FIG. 5 would instead be Flit Buffers 0 through M−1.

A disaggregated memory appliance has been disclosed. The present invention has been described in accordance with the embodiments shown, and there could be variations to the embodiments, and any variations would be within the spirit and scope of the present invention. For example, the example embodiment can be implemented using hardware, software, a computer readable medium containing program instructions, or a combination thereof. Software written according to the present invention is to be either stored in some form of computer-readable storage medium such as a memory, a hard disk, or a solid state drive and is to be executed by a processor. Accordingly, many modifications may be made by one of ordinary skill in the art without departing from the spirit and scope of the appended claims.

We claim:

1. A memory appliance, comprising:
   a plurality of leaf memory switches that each manage one or more memory channels of one or more of leaf memory modules;
   a low-latency memory switch that arbitrarily connects one or more external processors to the plurality of leaf memory modules over a host link; and
   a management processor that responds to requests from one or more external processors for management, maintenance, configuration and provisioning of the leaf memory modules within the memory appliance but does not participate in movement of data except to access resources provisioned for the management processor;
   wherein the management processor is implemented as part of a compute complex that enables multiple functions, including boot and initial configuration of the memory appliance, coordination of memory allocation for the one or more external processors, compute offloading, and setup of wormhole switching in which endpoints use target routing data supplied during a memory provisioning process to effect low-latency switching of memory data flits and metadata.

2. The memory appliance of claim 1, further comprising: a plurality of leaf links that connect the low-latency memory switch to the plurality of leaf memory switches.

3. The memory appliance of claim 2, wherein the management processor accepts and processes the requests from the one or more external processors for access to, or provisioning of, the leaf memory modules based on policy from a datacenter resource management service; and configures the leaf memory modules and leaf memory switches to satisfy requests for memory.

4. The memory appliance of claim 3, wherein the management processor creates and maintains a configuration and allocation database to manage the leaf memory modules.

5. The memory appliance of claim 1, wherein the management processor is coupled to other components of the compute complex, including a complex programmable logic device (CPLD), a network port, a voltage regulation component, a clock generator and distribution component, an EEPROM, a flash (BIOS) memory, and a solid-state drive.

6. The memory appliance of claim 1, wherein the leaf memory switch comprises:
   a leaf link PHY coupled to a leaf link layer controller; a low latency switch coupled to the leaf link controller; a lightweight memory controller and PHY pair for each memory channel coupled to the low latency switch; and wherein the management processor is coupled to low latency switch and the lightweight memory controllers.

7. The memory appliance of claim 1, wherein the memory appliance uses a low-latency routing protocol used by both the low-latency memory switch and the leaf memory switches that encapsulate memory technology specific semantics by use of tags that uniquely identify the memory-technology during provisioning, monitoring and operation.

8. A method for providing a disaggregated memory appliance, comprising:
   coupling a low-latency memory switch to a host link over which the low-latency memory switch receives requests and traffic from one or more external processors;
   using a plurality of leaf links to connect the low-latency memory switch to a plurality of leaf memory switches that are connected to, and manage, one or more memory channels of one or more of leaf memory modules; and
   responding, by a management processor, to the requests from the one or more external processors for management, maintenance, configuration and provisioning of the leaf memory modules within the memory appliance but not participating in movement of data except to access resources provisioned for the management processor;
   wherein the management processor is implemented as part of a compute complex that enables multiple functions, including boot and initial configuration of the memory appliance, coordination of memory allocation for the one or more external processors, compute offloading, and setup of wormhole switching in which endpoints use target routing data supplied during a memory provisioning process to effect low-latency switching of memory data flits and metadata.

9. The method of claim 8, further comprising:
accepting and processing, by the management processor, the requests for access to, or provisioning of, the leaf memory modules based on policy from a datacenter resource management service; and configuring the leaf memory modules and leaf memory switches to satisfy requests for memory.

10. The method of claim 9, further comprising:
creating and maintaining, by the management processor, a configuration and allocation database to manage the leaf memory modules.

11. The method of claim 8, further comprising:
coupling the management processor to other components of the compute complex, including a complex programmable logic device (CPLD), a network port, a voltage regulation component, a clock generator and distribution component, an EEPROM, a flash (BIOS) memory, and a solid-state drive.

12. The method of claim 8, wherein the leaf memory switch comprises:
a leaf link PHY coupled to a leaf link layer controller; a low latency switch coupled to the leaf link controller; a lightweight memory controller and PHY pair for each memory channel coupled to the low latency switch; and wherein the management processor is coupled to low latency switch and the lightweight memory controllers.

13. The method of claim 8, further comprising:
using a low-latency routing protocol by both the low-latency memory switch and the leaf memory switches that encapsulate memory technology specific semantics by use of tags that uniquely identify the memory-technology during provisioning, monitoring and operation.

\* \* \* \* \*